(12) United States Patent
Shin et al.

(10) Patent No.: US 9,750,037 B2
(45) Date of Patent: Aug. 29, 2017

(54) INTERFERENCE RECOGNITION BASED D2D RESOURCE ALLOCATION METHOD AND APPARATUS THEREFOR

(71) Applicant: SOONGSIL UNIVERSITY RESEARCH CONSORTIUM TECHNO-PARK, Seoul (KR)

(72) Inventors: Oh-Soon Shin, Seoul (KR); Gil Mo Kang, Seoul (KR); Hyeon Min Kim, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 140 days.

(21) Appl. No.: 14/864,882

(22) Filed: Sep. 25, 2015

(65) Prior Publication Data
US 2016/0100412 A1   Apr. 7, 2016

(30) Foreign Application Priority Data
Oct. 6, 2014  (KR) ........................ 10-2014-0134299

(51) Int. Cl.
  *H04W 72/04* (2009.01)
  *H04W 72/08* (2009.01)
  *H04W 76/04* (2009.01)
  *H04W 72/12* (2009.01)

(52) U.S. Cl.
  CPC ....... *H04W 72/082* (2013.01); *H04W 76/043* (2013.01); *H04W 72/1289* (2013.01)

(58) Field of Classification Search
  CPC ...... H04W 72/08; H04W 72/04; H04W 72/12
  See application file for complete search history.

(56) References Cited

U.S. PATENT DOCUMENTS

| | | | |
|---|---|---|---|
| 2012/0243431 A1* | 9/2012 | Chen ................ | H04W 72/0406 370/252 |
| 2015/0117239 A1* | 4/2015 | Lindoff ................ | H04W 72/08 370/252 |

FOREIGN PATENT DOCUMENTS

KR   10-2008-0028347 A   3/2008

* cited by examiner

*Primary Examiner* — Lakeram Jangbahadur
(74) *Attorney, Agent, or Firm* — Revolution IP, PLLC

(57) ABSTRACT

Disclosed herein is an interference recognition-based D2D resource allocation method that uses a base station in a cellular system which includes the base station, a plurality of cellular terminals being in a cell that the base station covers, and a plurality of D2D terminals, including: receiving information of a resource block of a least interference amount that a D2D receiving terminal obtains through resource search and information of search time of the resource search from the D2D receiving terminal; obtaining information of a cellular terminal corresponding to the received resource block and the search time among the plurality of cellular terminals from resource scheduling information storing allocation information of the resource block depending on time per each cellular terminal; and simultaneously allocating frequency resource of the cellular terminal to the D2D receiving terminal and a D2D transmitting terminal by using resource scheduling information corresponding to the obtained cellular terminal.

4 Claims, 9 Drawing Sheets

Infrastructure-based communication

D2D communication

FIG. 8

INTERFERENCE RECOGNITION BASED D2D RESOURCE ALLOCATION METHOD AND APPARATUS THEREFOR

CROSS-REFERENCE TO RELATED APPLICATION

This application claims priority to and the benefit of Korean Patent Application No. 10-2014-0134299 filed in the Korean Intellectual Property Office on Oct. 6, 2014, the entire contents of which are incorporated herein by reference.

BACKGROUND OF THE INVENTION (a) Field of the Invention

The present invention relates to an interference recognition-based device-to-device (D2D) resource allocation method and an apparatus therefor. More particularly, the present invention relates to an interference recognition-based D2D resource allocation method and an apparatus therefor that use cooperation between a base station and a D2D.

(b) Description of the Related Art

Recently, a device-to-device (D2D) communication in a cellular system is under research and development (R&D) and standardization. The D2D communication allows positionally-adjacent terminals to directly communicate each other without using an existing infrastructure such as a base station or an access point (AP).

FIG. 1 illustrates a schematic diagram of a D2D communication. The existing infrastructure-based communication is a method that terminals communicate each other through a base station, and the D2D communication performs direct communication between terminals without going through a base station.

In the cellular system, when the D2D communication is performed between the positionally adjacent terminals, since a load of the base station may be distributed and a relatively short-range communication may be performed, consumption power of the terminal may be reduced and a latency may also be reduced. In view of an overall system, the D2D terminal shares the same frequency with the existing cellular terminal to spatially reuse the frequency, thereby improving use efficiency.

The D2D communication enables a new service based on proximity and improves frequency efficiency of the cellular system at the same time. Generally, the D2D terminal shares an existing cellular frequency resource of the cellular terminal so as to improve frequency efficiency. However, in the process of sharing the frequency resource, since interference between the D2D terminal and the cellular terminal may occur, a resource allocation technology that can properly control the interference is required.

Since a D2D link shares a frequency resource with a cellular link, interference between the D2D link and the cellular link necessarily occur. When the interference is not properly controlled, the D2D communication is difficult and even performance for a cellular user may deteriorate.

In a single cell environment, when the D2D link shares a cellular uplink resource, there may be three generable kinds of interference. That is, there are the interference that the cellular terminal gives to D2D terminal, the interference that the D2D terminal gives to the base station, and the interference between the D2D links. An effective interference control is significantly important for a cellular-based D2D communication. Here, the interference control may be implemented through a resource allocation.

A difference between the cellular-based D2D communication and the D2D communication in a non-licensed frequency bandwidth is that a base station for the cellular-based D2D communication may be involved in D2D communication control processes including a resource allocation process.

FIG. 2 is a drawing illustrating cellular-based D2D communications classified into three types depending on a degree in which a base station is involved. In the case of a distributed-D2D, when the data signal and the control signal are transmitted between the terminals, the base station is not involved therein. In the case of a centralized-D2D, only the data signal is directly transmitted between the terminals, and the control signal is transmitted by the base station.

Further, although the centralized-D2D method in which the base station collects channel information or distance information of the links and allocates D2D resource based on the collected information has good performance, a load of a signal process therefor is heavy, and it may be difficult to apply the centralized-D2D method in a situation that the base station can normally not operate as in a disaster situation. Further, since the distributed-D2D is a method in which the D2D terminal recognizes peripheral interference and allocates resources by itself, although there is no load burdened on the base station, since the resource allocation for a cellular user is dynamically changed, which may not be easily controlled by the D2D terminal.

The background art of the present invention is disclosed in the Korean Patent Laid-Open Publication No. 2008-0028347 (laid-open on Mar. 31, 2008).

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an interference recognition-based D2D resource allocation method and an apparatus therefor that may complement or solve problems of the centralized-D2D and distributed-D2D methods in the related art by using a hybrid D2D method in which a base station and D2D terminal cooperatively perform D2D resource allocation.

An exemplary embodiment of the present invention provides an interference recognition-based D2D resource allocation method that uses a base station in a cellular system which includes the base station, a plurality of cellular terminals and a plurality of D2D terminals being in a cell that the base station covers, including: receiving information of a resource block of a least interference amount that a D2D receiving terminal obtains through resource search and information of search time of the resource search from the D2D receiving terminal; obtaining information of a cellular terminal corresponding to the received resource block and the search time among the plurality of cellular terminals from resource scheduling information storing allocation information of the resource block depending on time per each cellular terminal; and simultaneously allocating frequency resource of the cellular terminal to the D2D receiving terminal and a D2D transmitting terminal by using resource scheduling information corresponding to the obtained cellular terminal.

The resource scheduling information may be a scheduling information in which an allocation value of the resource block is dynamically changed per each time period.

The allocating of the frequency resource may simultaneously allocate resource scheduling information corresponding to the cellular terminal to the D2D receiving terminal and the D2D transmitting terminal, and the D2D receiving terminal may communicate with the D2D transmitting terminal by dynamically using a resource block equal to the resource block allocated to the cellular terminal per each time period.

The allocating of the frequency resource may include: extracting only one resource block corresponding to a present time from in resource scheduling information corresponding to the cellular terminal; generating fixed resource scheduling information configured of only the one resource block; and simultaneously allocating the generated fixed resource scheduling information to the cellular terminal, the D2D receiving terminal, and the D2D transmitting terminal, and the D2D receiving terminal may communicate with the D2D transmitting terminal by statically using a resource block equal to the resource block allocated to the cellular terminal per each time period.

The D2D receiving terminal may retry the resource search when a response is not transmitted thereto from the D2D transmitting terminal.

Another embodiment of the present invention provides an interference recognition-based D2D resource allocation apparatus that uses a base station in a cellular system which includes the base station, a plurality of cellular terminals and a plurality of D2D terminals being in a cell that the base station covers, including: a search resource receiver receiving information of a resource block of a least interference amount that a D2D receiving terminal obtains through resource search and information of search time of the resource search from the D2D receiving terminal; a cellular resource searcher obtaining information of a cellular terminal corresponding to the received resource block and the search time among the plurality of cellular terminals from resource scheduling information storing allocation information of the resource block depending on time per each cellular terminal; and a resource allocator simultaneously allocating frequency resource of the cellular terminal to the D2D receiving terminal and a D2D transmitting terminal by using resource scheduling information corresponding to the obtained cellular terminal.

According to embodiments of the present invention, it is possible for a D2D terminal to effectively share dynamically changed cellular resource and to minimize influence of interference by scheduling resources of the D2D terminal so that a base station receiving feedback optimal interference recognition-based cellular resources from the D2D terminal, based on the feedback received resources, and a corresponding cellular terminal can use the same resource.

BRIEF DESCRIPTION OF THE DRAWINGS

FIG. 8 illustrates an exemplary diagram for a static synchronization scheduling method according to an exemplary embodiment of the present invention.

DETAILED DESCRIPTION OF THE EMBODIMENTS

The present invention will be described more fully hereinafter with reference to the accompanying drawings, in which exemplary embodiments of the invention are shown.

The present invention provides an interference recognition-based device-to-device (D2D) resource allocation method and an apparatus therefor in which a D2D terminal shares frequency resources with a cellular terminal in a cellular system supporting a D2D communication.

For this purpose, an exemplary embodiment of the present invention provides a hybrid D2D resource allocation method in which a base station and a D2D terminal cooperatively perform D2D resource allocation, and complements the drawbacks of the centralized-D2D method and the distributed-D2D method of the related art.

First, the D2D terminal (D2D receiving terminal) recognizes an interference situation of cellular resources existing around in a cell based on an interference recognition technology, and then determines the most appropriate cellular resource to share with its own D2D link. The D2D terminal reports the information (the determined cellular resource) to the base station, and the base station identifies a cellular terminal corresponding to the determined cellular resource based on the information. Then, the base station allocates the same resource to the corresponding cellular terminal and the D2D terminal such that the cellular and D2D link may effectively share resources while reducing influence of interference.

Figure 1:
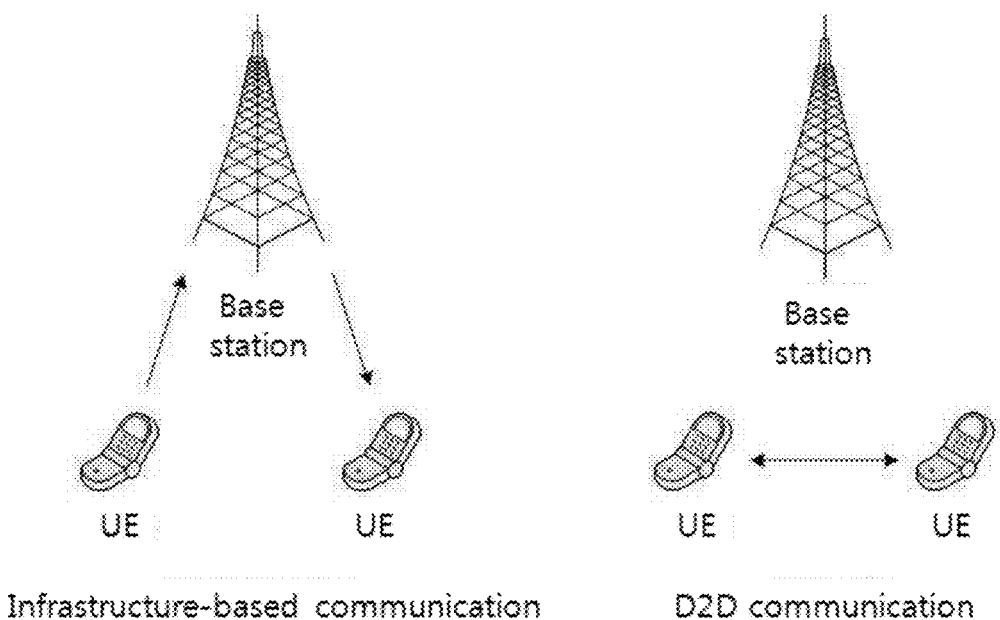
FIG. 1 illustrates a schematic diagram of a D2D communication.
Figure 2:
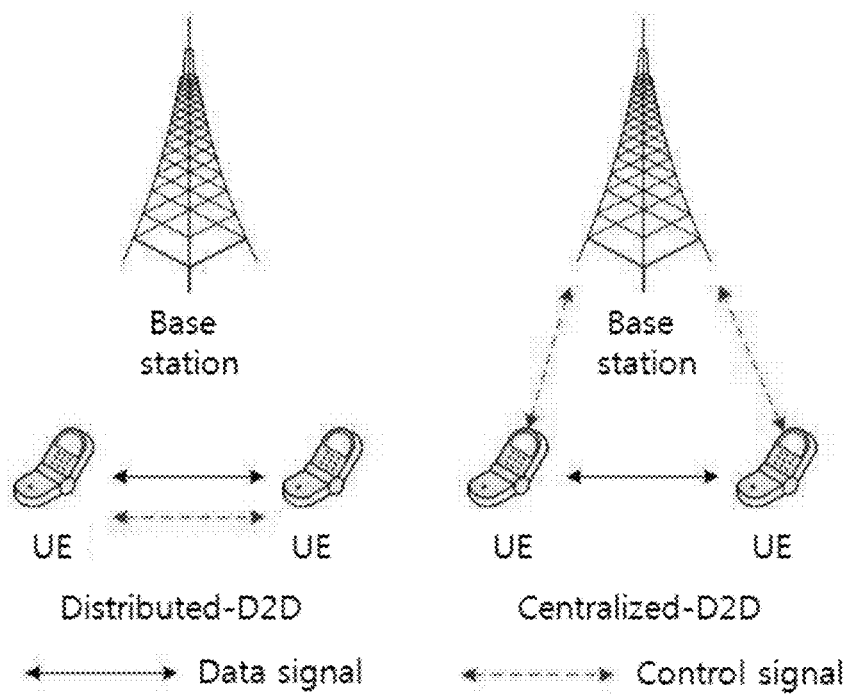
FIG. 2 is a drawing illustrating cellular-based D2D communications classified into three types depending on a degree in which a base station is involved.
Figure 3:
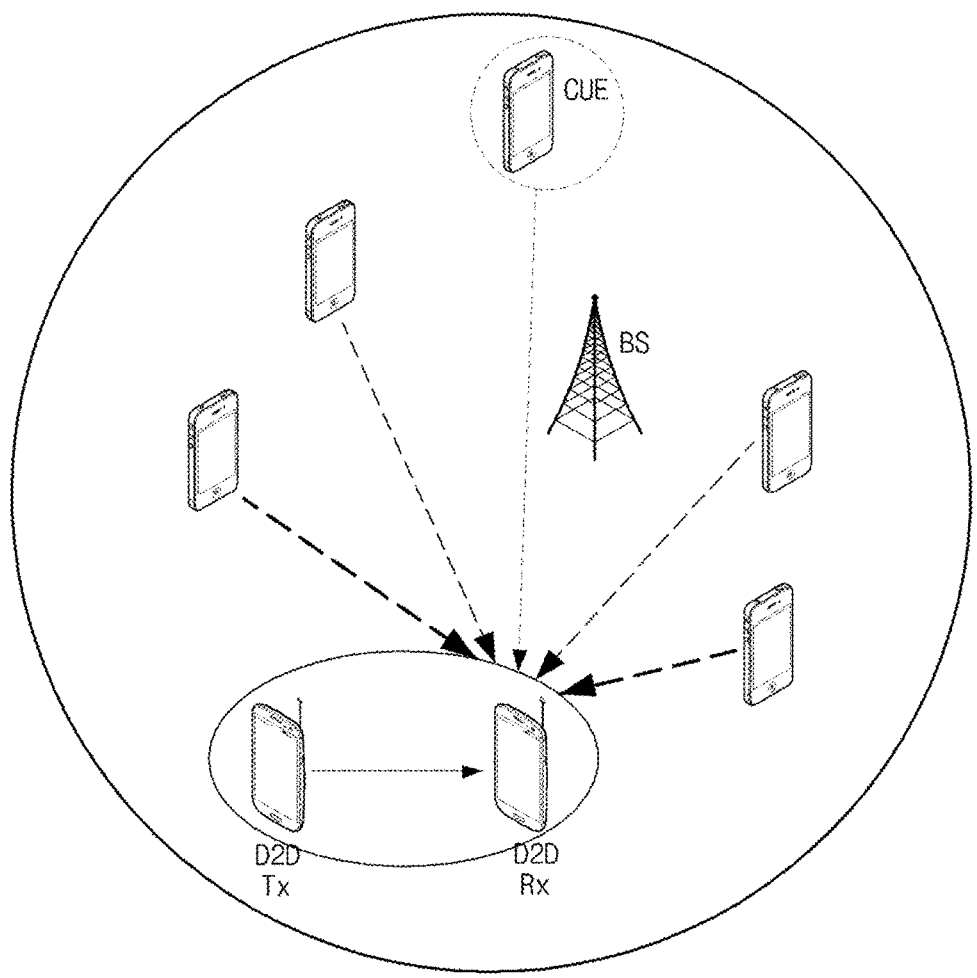
FIG. 3 illustrates a schematic diagram of a cellular system model considered in an exemplary embodiment of the present invention.

FIG. 3 illustrates a schematic diagram of a cellular system model considered in an exemplary embodiment of the present invention. A cellular system includes a base station (BS), a plurality of cellular terminals (cellular user equipments (CUE)) within a cell that the base station (BS) covers, and a plurality of D2D terminals (D2D UE: D2D User Equipment).

In the exemplary embodiment of the present invention, it is assumed that the cellular terminal and the D2D terminal share a cellular uplink resource in a single cell environment.

This is because it is known that sharing the uplink resource is effective in transmission RF chain reuse of a terminal and interference.

In FIG. 3, the D2D terminals (D2D UEs) consist of a pair of a D2D transmitting terminal (D2D Tx) and a D2D receiving terminal (D2D Rx), and it is assumed that the D2D transmitting terminal and the D2D receiving terminal are within a predetermined distance. Further, it is assumed that a transmitting power of each cellular terminal is set so that a receiving signal-to-noise ratio (SNR) in the base station is a predetermined target value.

In addition, the cellular uplink resource may be configured of N resource blocks (RB), and each cellular terminal (CUE) may receive one allocated RB to uplink-transmit. The D2D (Tx/Rx) terminals may share the RB allocated to the cellular terminal (CUE), for convenience, it is assumed that they share one RB per D2D link.

Although FIG. 3 illustrates one pair of D2D terminal in the cell for convenience of description, a plurality of pairs of D2D terminals may exist in the cell (circular cell area based on the base station) that the base station (BS) covers.

In the D2D communication, the D2D transmitting terminal directly transmits data to the D2D receiving terminal. However, the D2D transmitting terminal and the D2D receiving terminal are not limited to a transmission or reception function, and they may have a communication function such as signal transmission and reception for a response or identification to data transmission and exchange of information with the base station.

In the exemplary embodiment of the present invention, the D2D receiving terminal measures an amount of interference received from the cellular terminal and determines resource by which optimal communication performance may be obtained, for sharing the cellular resource. For example, the D2D receiving terminal uses an interference recognition-based technology for recognizing the amount of interference received from a plurality of cellular terminals. The D2D receiving terminal senses the RBs of the cellular terminals to select an RB of the least interference.

For example, the D2D receiving terminal may search a frequency resource of the cellular terminal with the least interference among frequency resources of all peripheral cellular terminals by using a spectrum sensing method or a carrier sensing method among the interference recognition technologies.

Here, a representative example of the spectrum sensing method in which a sub-user determines whether a main-user uses a spectrum or not in a recognition wireless system is energy detection, signal characteristic detection, etc. In the case of the energy detection, the least RB is searched through the detected energy. Since the spectrum sensing method and the carrier sensing method are well known in the art, a detailed description thereof will be omitted.

FIG. 3 schematically illustrates interference applied to a specific D2D receiving terminal. When the plurality of cellular terminals within the cell use the same transmitting power and consider only path-loss depending on a distance, the least interference will be measured at an RB allocated to the farthest cellular terminal from the D2D receiving terminal.

In a real environment, because the transmitting powers of respective cellular terminals are different from each other and because of shadow effect and influence of fading, a cellular terminal corresponding to the optimal RB may not be the farthest cellular terminal. However, if a channel environment is not changed, it is most preferable to share an RB corresponding to the least interference in an interference recognition process.

In the exemplary embodiment of the present invention, since the base station (BS) mainly performs the resource allocation, a resource allocation apparatus described below means to be included in the base station. Here, although the main for the resource allocation is the base station, interference information for resource allocation is determined by interference recognition (ex, spectrum sensing) in the D2D terminal. The D2D link may effectively share the dynamically changed cellular resource through the processes.

A resource allocation apparatus and a method therefor according to an exemplary embodiment of the present invention will now be described more detail.

Figure 4:
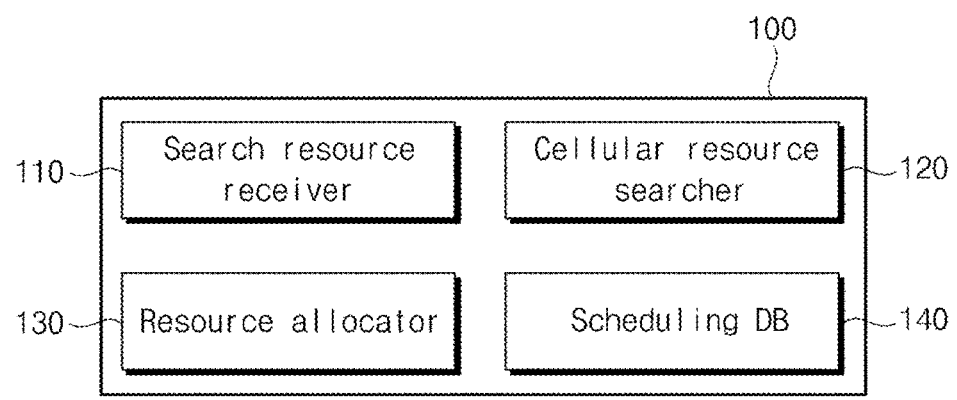
FIG. 4 illustrates a schematic diagram of a resource allocation apparatus according to an exemplary embodiment of the present invention.
Figure 5:
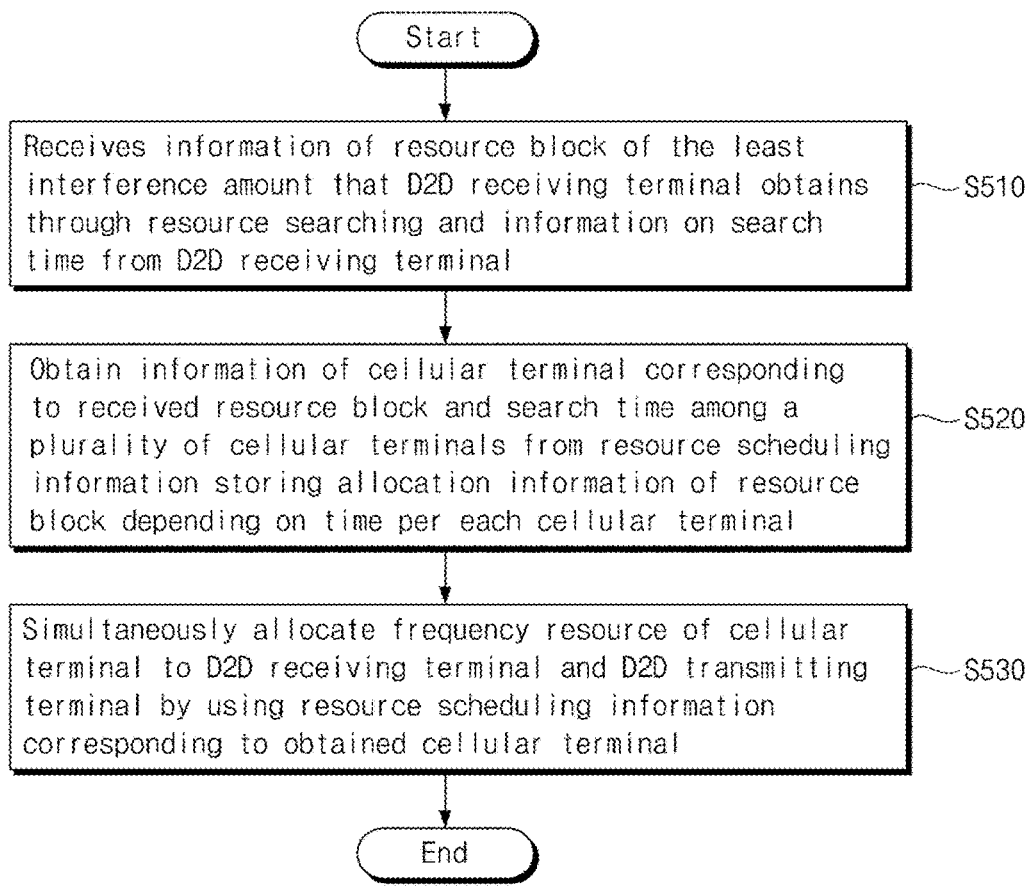
FIG. 5 illustrates a flowchart of a resource allocation method of using the resource allocation apparatus of FIG. 4.

FIG. 4 illustrates a schematic diagram of a resource allocation apparatus according to an exemplary embodiment of the present invention, and FIG. 5 illustrates a flowchart of a resource allocation method of using the resource allocation apparatus of FIG. 4. Referring to FIGS. 4 and 5, a resource allocation apparatus 100 according to an exemplary embodiment of the present invention includes a search resource receiver 110, a cellular resource searcher 120, a resource allocator 130, and a scheduling DB 140.

First, frequency resources that cross each other according to time are allocated to the plurality of cellular terminals (CUE) in the cell. The base station (BS) stores RB information with respect to the resources allocated to each cellular terminal in a resource allocation map configured of a time axis and a frequency axis. According to the present exemplary embodiment, the frequency resource of the cellular terminal in which influence of interference is minimum with respect to the D2D terminal among the plurality of cellular terminals in the cell is allocated to the D2D terminal.

The D2D receiving terminal (D2D Rx) searches information for the resource block (RB) of the least interference amount among the resource blocks (RB) detected in the vicinity thereof by using the interference recognition (ex, spectrum sensing). Then, the D2D receiving terminal (D2D Rx), while reporting the information on the searched resource block and the searched time to the base station (BS), simultaneously requests a resource allocation to the base station (BS).

Hereinafter, the present exemplary embodiment will be described in terms of the base station (BS) based on the above-described contents. First, the search resource receiver 110 in the base station (BS) receives information on the resource block of the least interference amount that the D2D receiving terminal (D2D Rx) obtains through the resource searching and information on the search time from the D2D receiving terminal (D2D Rx) (S510).

The base station (BS) previously stores resource scheduling information with respect to the respective cellular terminals in the scheduling DB 140. The resource scheduling information previously stored in the scheduling DB 140 means the allocation information of the resource block depending on time with respect to the respective cellular terminals in the cell. That is, the resource scheduling information is scheduled so that a value of the resource block is dynamically allocated to one cellular terminal per time period.

After S510, the base station (BS) may identify any cellular terminal to which the corresponding resource block is allocated at time corresponding to the search time based on the resource scheduling information stored in the scheduling DB 140. That is, the cellular resource searcher 120 obtains information of the cellular terminal corresponding to the received resource block and the search time among the plurality of cellular terminals with reference to the resource scheduling information (S520).

Next, the resource allocator 130 simultaneously allocates the frequency resource of the cellular terminal to the D2D receiving terminal and the D2D transmitting terminal by using the resource scheduling information corresponding to the obtained cellular terminal in the resource scheduling information of the scheduling DB 140 (S530).

Accordingly, the D2D receiving terminal and the D2D transmitting terminal may perform a direct data communication between the terminals by using the frequency resource allocated from the resource allocator 130. As a result, the D2D terminal shares the RB of the cellular terminal having the least interference to perform communication.

Further, since the D2D terminal substantially follows the resource scheduling information dynamically changed with respect to the corresponding cellular terminal, although the RB of the corresponding cellular terminal may be dynamically changed depending on time, the frequency resource may be shared to be corresponded to the RB.

In the cellular network, since the resource allocation to the cellular terminal is changed in a scheduling period, the RB that the D2D terminal has searched in the resource search process may be meaningless. However, according to the exemplary embodiment of the present invention described above, the problem may be solved by using the scheduling information synchronized based on the cellular terminal to which the corresponding RB is allocated at the same time as the optimal RB of the D2D terminal depending on the help of the base station to perform the D2D and the cellular resource allocation.

Figure 6:
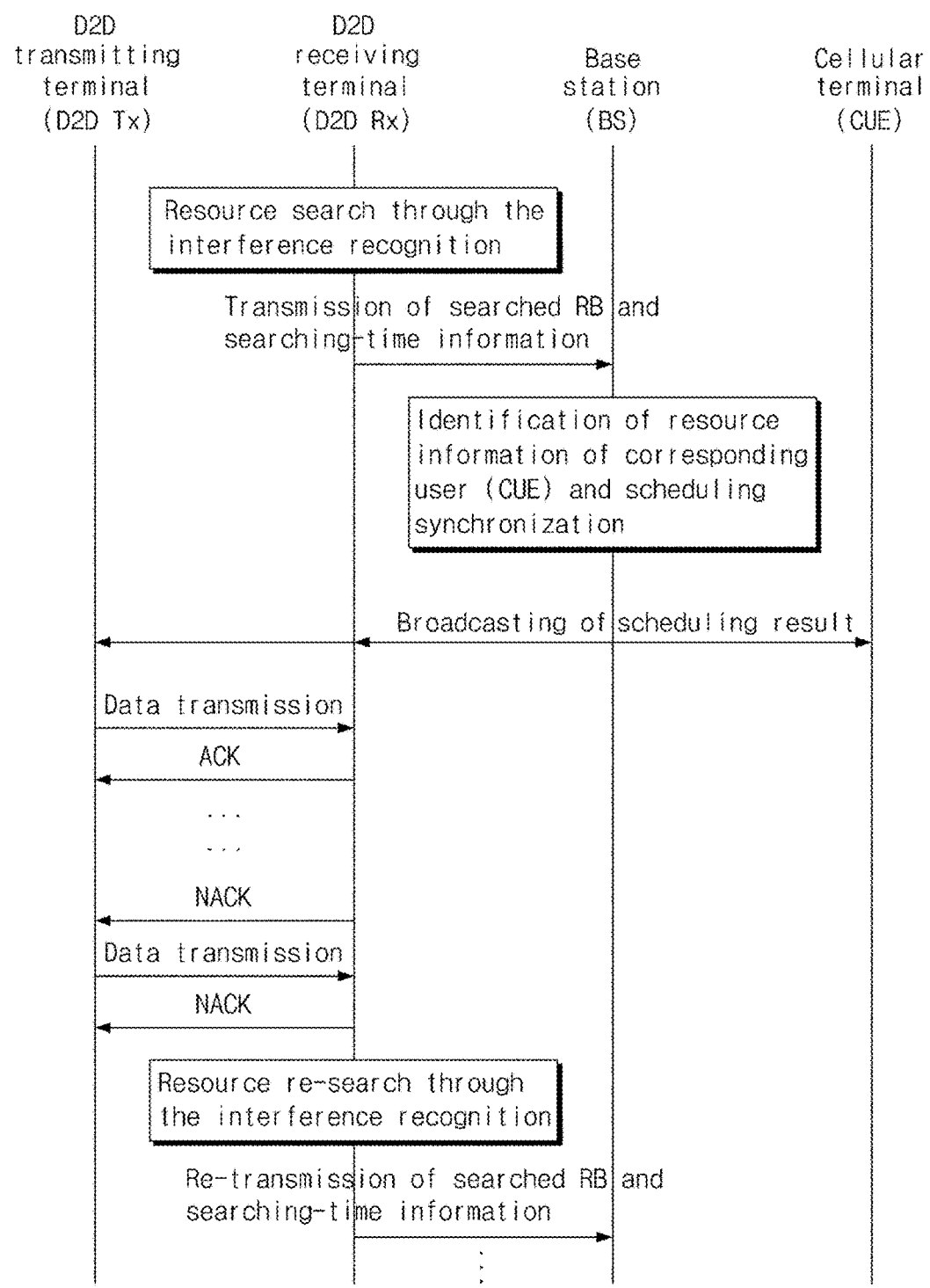
FIG. 6 is a drawing illustrating resource allocation and data transmission flow according to an exemplary embodiment of the present invention.

FIG. 6 is a drawing illustrating resource allocation and data transmission flow according to an exemplary embodiment of the present invention.

First, the D2D receiving terminal (D2D Rx) to perform the D2D communication determines the optimal RB by the resource search through the interference recognition. Then, the D2D receiving terminal (D2D Rx) reports the information of the determined optimal RB and the information of the search time to the base station (BS), and simultaneously requests the resource allocation.

Then, the base station (BS) identifies one cellular terminal (CUE) corresponding to both the information of the time at which the D2D receiving terminal (D2D Rx) preforms the resource search and the information of the optimal RB from among the plurality of cellular terminals in the cell. For the purpose, the base station (BS) may be required to store the resource scheduling information for a determined time.

Subsequently, the base station (BS) synchronizes the resource scheduling of the cellular terminal (CUE) and the resource scheduling of the D2D terminal (D2D Rx, D2D Tx), and broadcasts the synchronized information to the respective terminals. Through such a process, the D2D terminal may share the same RB with the cellular terminal (CUE) determined to have the least interference during the resource search process.

If a lot of negative acknowledgment (NACK) occur while the D2D communication is performed, since there is a high possibility that interference situation has changed due to movement of the terminal or the like, the D2D receiving terminal (D2D Rx) performs re-search of resources and may receive allocation of the RB from the base station (BS) in the aforementioned same method.

The time required for the resource search and the feedback delay required for the report to the base station may be the same as a channel quality indicator (CQI) measurement and the feedback delay of the cellular terminal. Accordingly, interference measurement having accuracy of the CQI level is possible, and change of the channel due to the feedback delay may be negligible.

According to the 3GPP LTE, the CQI feedback delay is four subframe periods, that is, about 4 ms. Since this is a time moving a distance of about 11 cm when the terminal moves at a speed of about 100 km/hr, the change of the channel due to the feedback delay may be negligible.

The exemplary embodiment of the present invention may be substantially divided into two. One is a dynamic synchronization scheduling method, and the other is a static synchronization scheduling method.

The dynamic synchronization scheduling method allocates the resource information of the cellular terminal dynamically scheduled according to time to D2D terminal to synchronize the D2D terminal to be suitable for the allocation resource of the cellular terminal.

The static synchronization scheduling method changes the resource scheduling information of the cellular terminal dynamically scheduled according to time to the static scheduling information with one RB, and allocates the static scheduling information to the D2D terminal and the cellular terminal to statically synchronize the D2D terminal.

Figure 7:
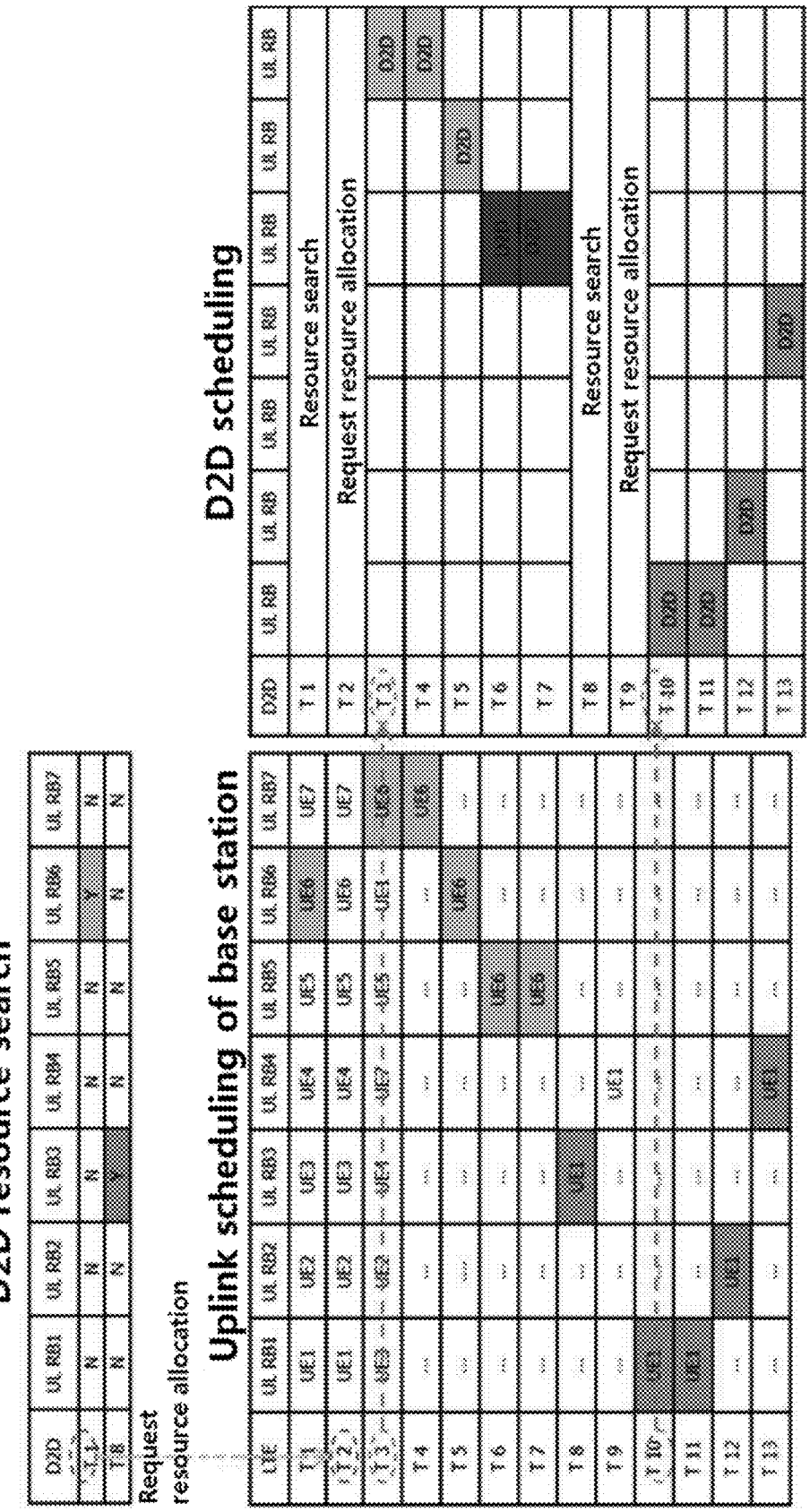
FIG. 7 illustrates an exemplary diagram for a dynamic synchronization scheduling method according to an exemplary embodiment of the present invention.

Detailed processes of the dynamic synchronization scheduling will now be described with reference to FIG. 7. FIG. 7 illustrates an exemplary diagram for a dynamic synchronization scheduling method according to an exemplary embodiment of the present invention.

FIG. 7 illustrates an uplink scheduling tables of the base station, which corresponds to resource scheduling information with respect to the respective cellular terminals. Referring to the uplink scheduling table, in the resource scheduling information, it is seen that allocation values of the resource block are dynamically changed per time period (T1, T2, . . . ) for one cellular terminal.

For example, in a case of scheduling information of a cellular terminal UE6, it is scheduled so that an RB6 is allocated at time T1 and time T2, an RB7 is allocated at time T3 and time T4, the RB6 is allocated at time T5, an RB5 is allocated at time T6 and time T7.

First, the D2D receiving terminal (D2D Rx) performs resource search for the time T1 to select RB6, an amount of interference of which is the smallest (refer to the D2D resource search table of FIG. 7).

Then, the D2 receiving terminal (D2D Rx) reports information of the RB6 and information of the time T1 at which the information is searched to the base station (BS) at the time T2 and requests resource allocation. Then, after the base station (BS) identifies information of the received RB6, the base station (BS) identifies that a corresponding cellular is the UE6 by identifying the scheduling information of the previous time T1 in the uplink scheduling table of FIG. 7.

In addition, the base station (BS) refers to the scheduling with respect to the cellular user at the time T3 to simultaneously allocate the RB7 allocated to the UE6 at the time T3 to the D2D terminals (D2D Tx and D2D Rx).

The D2D terminals (D2D Tx and D2D Rx) use the RB7 which the UE6 uses at the time T4 to communicate each other.

From now on, the D2D terminals (D2D Tx and D2D Rx) identify the scheduling information from the base station (BS) per each time period to communicate each other with using an RB equal to the RB which the UE6 uses. After the time T3, the D2D allocation resource is referred to a D2D scheduling table disposed at the right side of FIG. 7.

As such, in the case of the dynamic synchronization scheduling method, when the frequency resource is allocated, the resource scheduling information corresponding to the corresponding cellular terminal UE6 is simultaneously allocated to two D2D terminals (D2D Tx and D2D Rx). Here, as described above, the allocation value of the resource block allocated to the UE6 per each time period is dynamically changed. Accordingly, in this case, the D2D receiving terminal (D2D Rx) dynamically uses a resource block equal to the resource block allocated to the UE6 per each time period to communicate with the D2D transmitting terminal (D2D Tx).

In addition, in such a data communication process, if the D2D receiving terminal (D2D Rx) does not receive a response from the D2D transmitting terminal (D2D Tx), it retries the resource search. In FIG. 7, the D2D receiving terminal (D2D Rx) re-performs the resource search at the time T8 to search the resource of the least interference as the RB3. The base station selects the UE1 which is the cellular terminal corresponding to the time T8 and the RB3 resource, after this, it shares the frequency resource allocated to the UE1 with the D2D terminal.

Figure 8:
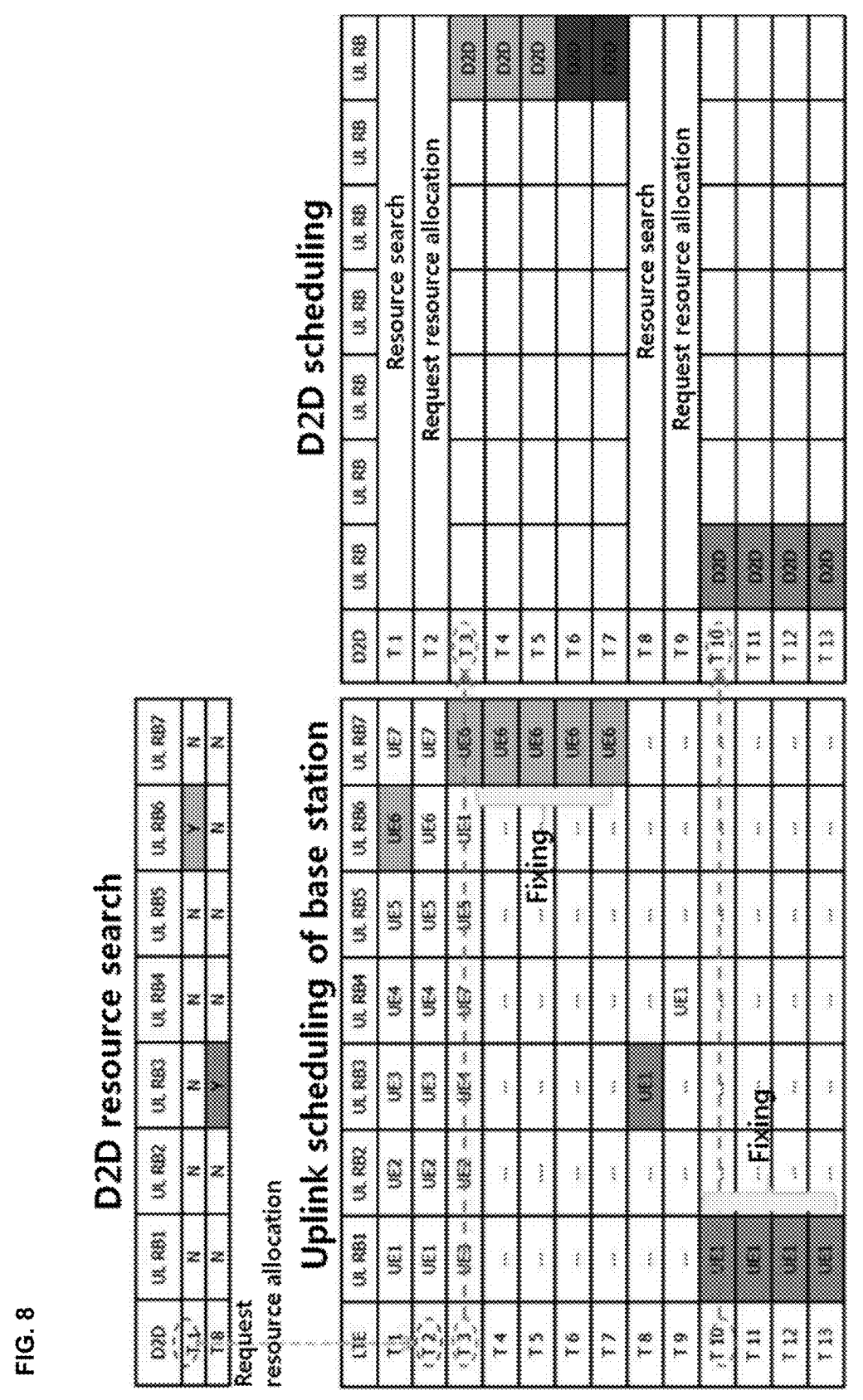

Hereinafter, the static synchronization scheduling method will be described. FIG. 8 illustrates an exemplary diagram for a static synchronization scheduling method according to an exemplary embodiment of the present invention.

In a case of the static synchronization scheduling method, the resource scheduling information in which an allocation value of the resource block (RB) is dynamically changed per each time period (T1, T2, . . . ) with respect to one cellular terminal is again changed into a fixed resource scheduling information configured of only one RB so as to share resource with the D2D terminal. For this purpose, the scheduling information of the cellular terminal is also synchronized to the fixed resource scheduling information. A detailed process thereof will now be described.

First, the D2D receiving terminal (D2D Rx) preforms the resource search at the time T1 to select the RB6 of the least interference amount.

Next, the D2 receiving terminal (D2D Rx) reports the information of the RB6 and the information of the time T1 at which the information is searched to the base station (BS) and requests the resource allocation. After the base station (BS) identifies the information of the received RB6, it identifies that the corresponding cellular is the UE6 by identifying the scheduling information of the previous time T1. So far, the static synchronization scheduling method is the same as the dynamic synchronization scheduling method of FIG. 7.

From a subsequent T3, only the RB7 allocated to the UE6 at the time T3 is used to fix the scheduling information. Further, the fixed scheduling information is simultaneously allocated to the UE6 and the D2D terminal.

The table with respect to the uplink scheduling of the base station shown in FIG. 8 corresponds to the fixed scheduling information, and it can be seen that it is different from that of FIG. 7. That is, the base station (BS) refers to the fixed scheduling at the time T3 and simultaneously allocates the RB7 allocated to the UE6 at the time T3 to the D2D terminals (D2D Tx and D2D Rx). The D2D terminals (D2D Tx and D2D Rx) also uses the RB7 that the UE6 uses at the time T4 to communicate each other.

From now on, the base station fixes the scheduling information of the UE6 to the RB7 and fixes the resource scheduling of the D2D to the RB7 as well. Accordingly, the D2D terminals (D2D Tx and D2D Rx) use the RB7 per each time period to communicate each other.

As such, in the case of the static synchronization scheduling method, when the frequency resource is allocated, only one resource block corresponding to the present time is extracted from in the resource scheduling information corresponding to the corresponding cellular terminal UE6, and fixed resource scheduling information configured of only the one resource block is generated and then the generated fixed resource scheduling information is simultaneously allocated to the cellular terminal UE6, the D2D receiving terminal (D2D Rx), and the D2D transmitting terminal (D2D Tx).

Accordingly, the D2D receiving terminal (D2D Rx) statically uses the resource block RB7 equal to the resource block allocated to the UE6 per each time period to communicate with the D2D transmitting terminal (D2D Tx). In this case, if the D2D receiving terminal (D2D Rx) does not receive a response from the D2D transmitting terminal (D2D Tx), it retries the resource search and repeats the above processes.

As a result, the dynamic synchronization scheduling method shown in FIG. 7 is a method that adjusts the D2D scheduling based on the cellular scheduling information. Since the scheduling information of the cellular is dynamically changed, the scheduling of the D2D should be changed according to the dynamically changed scheduling information, and the D2D should frequently identify the resource allocation information as the cellular does.

The static synchronization scheduling shown in FIG. 8 is a method that fixes the cellular scheduling information based on the resource search information of the D2D. Although performance of the cellular may deteriorates due to the fixed scheduling of the cellular terminal, since the D2D does not identify additional scheduling information until before re-search of resource after the first resource allocation, a load thereof may be reduced.

According to the exemplary embodiment of the present invention, the D2D terminal uses the interference recognition technology and performs the resource search by itself, thereby reducing the load of the base station than the centralized-D2D. In addition, although the distributed-D2D method of the related art has the control problem due to the dynamic change of the cellular scheduling, the present exemplary embodiment uses the synchronization scheduling between the cellular terminal and the D2D terminal by receiving assistance of the base station, thereby solving the control problem.

Simulation results according to the exemplary embodiment of the present invention will now described.

The following six layout options are defined for estimation of performance of the D2D technology in the LTE-advanced system.

1) Option 1: Urban macro (500 m ISD)+1 RRH/Indoor Hotzone per cell
2) Option 2: Urban macro (500 m ISD)+1 Dual stripe per cell
3) Option 3: Urban macro (500 m ISD) (all UEs outdoor)
4) Option 4: Urban macro (500 m ISD)+3 RRH/Indoor Hotzone per cell
5) Option 5: Urban macro (1732 m ISD)
6) Option 6: Urban macro (100 m ISD)

Options 1, 2, 3, 4, and 6 use a parameter defined in the 3GPP Case 1, and Option 5 uses a parameter defined in the 3GPP Case 3. Option 1 and Option 3, which are the most common environment, are considered for estimation of performance of the resource allocation method of the present invention. In the environment of Option 1, ⅔ of the total terminals are uniformly disposed in a small cell, and ⅓ of the total terminals are uniformly disposed in a macro cell outside the small cell. In the environment of Option 3, all users in the macro cell are uniformly disposed.

The path loss according to a distance and the independent rayleigh fading is applied to all communication links (a cellular-base station, a cellular-RRH (a small cell), D2D Tx-D2D Rx) and all interference links (CUE-D2D Rx, D2D Tx-base station, D2D Tx-RRH, and D2D Tx-Other D2D Rx). Exponents of the path loss are commonly set to about 3.5.

Table 1 summarizes the main parameters applied to the simulation.

TABLE 1

| Parameter | Value |
| --- | --- |
| Total number of UE | 100 |
| Number of CUE | ⅔ or ⅓ UE's |
| Number of D2D UE | ⅓ or ⅔ UE's |
| Number of RB | 100 |
| Target SNR of CUE | 20 dB |
| Macro cell radius | 167 m (500 m ISD) |
| small cell radius | 40 m |
| Maximum communication distance of D2D | 40 m |

The number of the total UE in the cell is set to 100, and the case (the CUEs are ⅔ thereof and the D2D users are ⅓ thereof) in which the number of the cellular users (CUE) is more than the number of the D2D users and the case (the CUEs are ⅓ thereof and the D2D users are ⅔ thereof) in which the number of the cellular users (CUE) is more than the number of the D2D users are divided to compare the performance thereof.

It is assumed that the number of the CUE is the same as the number of the RB and one RB is allocated at each CUE, and the target SNR for determining the transmitting power of the CUE is fixed, for convenience, to about 20 dB. The macro cell radius is set to 167 m corresponding to one sector of 500 m ISD.

Figure 9:
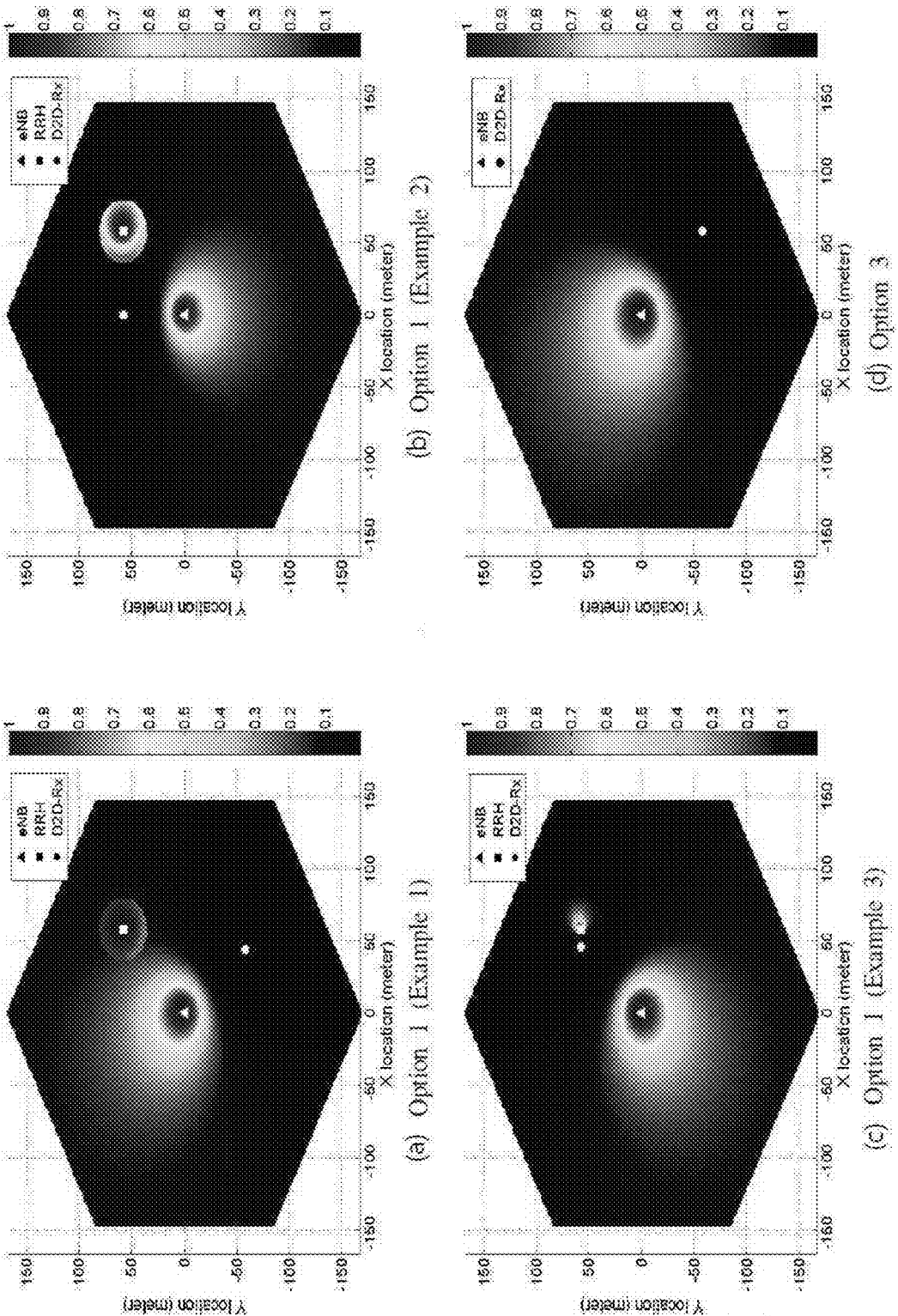
FIG. 9 consists of views illustrating simulation results of a resource allocation method according to an exemplary embodiment of the present invention, by a layout option.

FIG. 9 consists of views illustrating simulation results of a resource allocation method according to an exemplary embodiment of the present invention, by a layout option.

View (a) of FIG. 9 as Option 1 illustrates relative SINR values of the D2D link depending on positions of the CUE. In the view (a), when the D2D UE is positioned far away from the small cell and shares the resource of the CUE around the macro cell with the CUE in the small cell, the highest SINR is represented. This is because the CUE close to the eNB (base station) transmits signals in a lower power than the CUE positioned in a distant place therefrom due to the power control of the CUE and since the CUE of the small cell uses a lower power than the CUE of the macro cell, the interference that affects to the D2D is relatively negligible.

View (b) of FIG. 9 illustrates a case in which the D2D UE is positioned at the center between the eNB (base station) and the small cell. In this case, when the D2D UE shares the resource of the CUE near the eNB (base station) and the RRH (small cell), the highest SINR may be obtained.

View (c) of FIG. 9 illustrates a case in which the D2D UE is positioned in the small cell. Since the resource of the CUE in the small cell is affected by high interference, it is difficult to use. Accordingly, when the D2D UE positioned in the small cell shares the resource of the CUE close to eNB (base station), the interference is minimized.

View (d) of FIG. 9 illustrates relative SINR values of the D2D depending on the position of the CUE in the environment of Option 3. Since all of the UEs in the macro cell are uniformly disposed in the environment of Option 3, as in the view (b) of FIG. 9, when the D2D UE shares the resource of the CUE close to the eNB (base station), a high SINR may be obtained.

Figure 10:
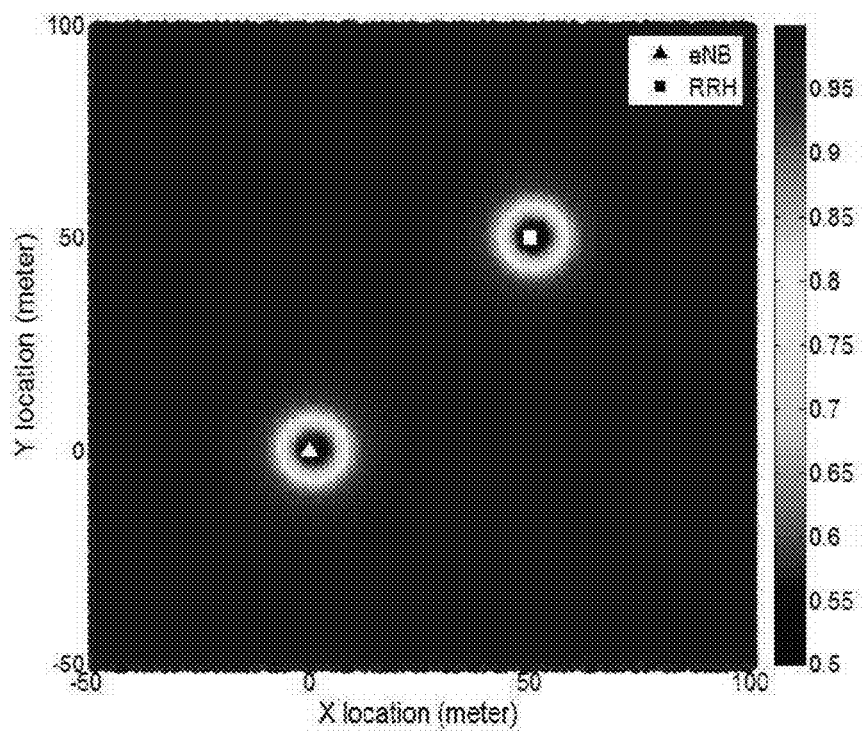
FIG. 10 is a drawing illustrating a relative SINR of a CUE depending on a position of a D2D in a resource allocation method according to an exemplary embodiment of the present invention.

FIG. 10 is a drawing illustrating a relative SINR of a CUE depending on a position of a D2D in a resource allocation method according to an exemplary embodiment of the present invention. As seen in FIG. 10, in order to reduce the interference affecting the CUE, the D2D is required to be away from the eNB (base station) and the RRH (small cell) by a predetermined distance, or the transmitting power of D2D is required to be reduced. In the method of solving the drawbacks, the D2D UE of the macro cell may share the resource of the CUE of the small cell, and the D2D UE of the small cell shares the resource of the CUE of the macro cell.

Figure 11:
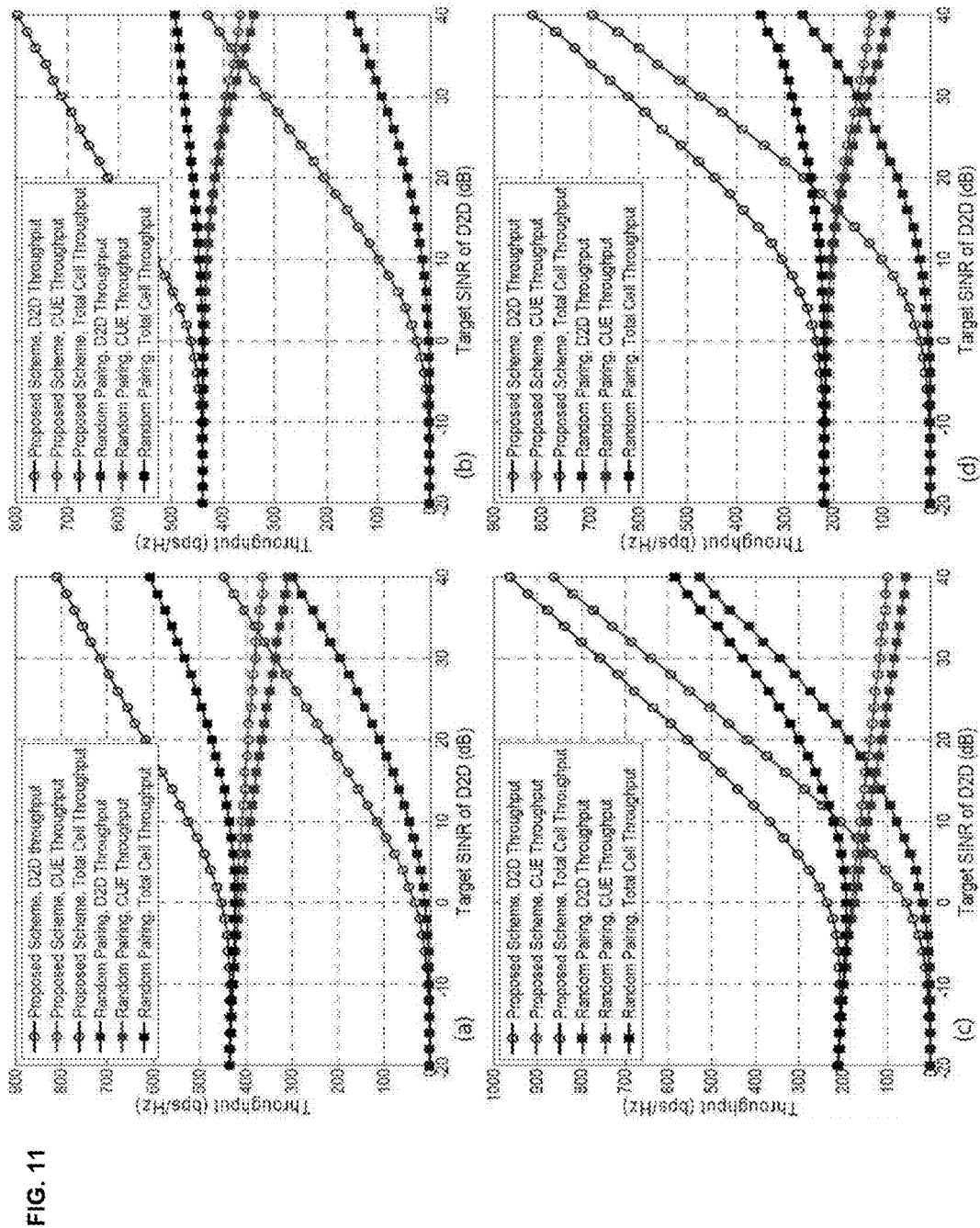
FIG. 11 consists of views illustrating throughput performance results of a resource allocation method according to an exemplary embodiment of the present invention.

FIG. 11 consists of views illustrating throughput performance results of a resource allocation method according to an exemplary embodiment of the present invention.

First, view (a) of FIG. 11 illustrates a graph comparing a case applying the proposed resource allocation method according to the exemplary embodiment of the present invention and a case applying the distributed-D2D resource allocation method in the environment of option 1 when the number of the CUE is more than that of the D2D UE with performance of the D2D UE, performance of the CUE, and throughput performance of the total cells.

As the distributed-D2D resource allocation is a case in which the D2D UE allocates resources by itself without involvement of the eNB, the resource information of the CUE is changed in the scheduling period, such that the recognition of the interference is meaningless. As a result, since it seems that the D2D randomly selects and uses the CUE resource, it is named random pairing.

When the D2D communication is supported in the cellular system by using the proposed resource allocation according to the exemplary embodiment of the present invention, it is possible to obtain considerable D2D performance gain greater than the random pairing and performance loss of the cellular system may also be reduced. As a result, it can be seen that a throughput gain of the total cells of the proposed method according to the exemplary embodiment of the present invention is much greater than that of the random pairing.

View (b) of FIG. 11 illustrates performance comparisons in the environment of Option 3 when the number of the CUE is more than that of the D2D UE. When the small cell does not exist, the D2D is affected with more interference from the CUE. In such an environment, there is a great difference between performances of the proposed method and the random pairing.

The random pairing is not able to realize the performance improvement of the total cells due to the small performance gain of the D2D and the performance loss of the CUE. However, when the proposed method is applied, it can be seen that the D2D may obtain a gain much greater than the random pairing and the performance improvement of the total cells is also considerably great.

Views (c) and (d) of FIG. 11, which are cases in which the number of D2D UE is more than that of the CUE in the environments of Option 1 and Option 3, since the resource that the D2D UE can select is relatively smaller than that of the views (a) and (b) of FIG. 11, a plurality of D2D UEs may frequently share the resource of one CUE.

Accordingly, since the interference by which the CUE is affected from the D2D is great, the performance of the CUE may greatly deteriorate. Like the results described above, when the proposed method is applied, it is possible to obtain more gain in the performance of the D2D and the total cells than that in the random pairing.

As described above, according to the exemplary embodiment of the present invention, it is possible for a D2D terminal to effectively share dynamically changed cellular resource and to minimize influence of interference by scheduling resources of the D2D terminal so that a base station receiving feedback optimal interference recognition-based cellular resources from the D2D terminal, based on the feedback received resources, and a corresponding cellular terminal can use the same resource.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A method for providing an interference recognition-based device to device (D2D) resource allocation in a cellular system, the method comprising:
   receiving information of a resource block of a least interference amount, the information being obtained by a D2D receiving terminal through resource search and information of search time of the resource search from the D2D receiving terminal;
   obtaining information of a cellular terminal corresponding to the received resource block and the search time among a plurality of cellular terminals, the information being obtained from resource scheduling information which storing allocation information of the resource block depending on time per each cellular terminal; and
   simultaneously allocating frequency resource of the cellular terminal to the D2D receiving terminal and a D2D transmitting terminal by using resource scheduling information of the cellular terminal, wherein
   the resource scheduling information is a scheduling information in which an allocation value of the resource block is dynamically changed per each time period, and
   the simultaneously allocating the frequency resource is performed by
   extracting only one resource block corresponding to a present time from in resource scheduling information corresponding to each cellular terminal, and generating fixed resource scheduling information configured of only the one resource block and simultaneously allocating the generated fixed resource scheduling information to the cellular terminal, the D2D receiving terminal, and the D2D transmitting terminal, and
   the D2D receiving terminal communicates with the D2D transmitting terminal by statically using a resource block equal to the resource block allocated to the cellular terminal per each time period.

2. The interference recognition-based D2D resource allocation method of claim 1, wherein the D2D receiving terminal retries the resource search when a response is not transmitted thereto from the D2D transmitting terminal.

3. A system for providing interference recognition-based D2D resource allocation, the system comprising:
   a base station including at least one of a search resource receiver, a cellular resource searcher, and a resource allocator being configured and executed by a processor using algorithms which associated with least one non-transitory storage device, the algorithms which when executed, causes the processor to perform the receiver, searcher and allocator;
   a plurality of cellular terminals and a plurality of D2D terminals being communicated with the base station via cellular network;
   the search resource receiver is configured to receive information of a resource block of a least interference amount, the information being obtained by a D2D receiving terminal through resource search and information of search time of the resource search from the D2D receiving terminal;
   the cellular resource searcher is configured to obtain information of a cellular terminal corresponding to the received resource block and the search time among the plurality of cellular terminals, the information being obtained from resource scheduling information which storing allocation information of the resource block depending on time per each cellular terminal; and
   the resource allocator is configured simultaneously to allocate frequency resource of the cellular terminal to the D2D receiving terminal and a D2D transmitting terminal by using resource scheduling information of the cellular terminal, wherein
   the resource scheduling information is a scheduling information in which an allocation value of the resource block is dynamically changed per each time period, and
   wherein the resource allocator is configured to extract only one resource block corresponding to a present time from in resource scheduling information corresponding to each cellular terminal, and to generate fixed resource scheduling information configured of only the one resource block and simultaneously allocates the generated fixed resource scheduling information to the cellular terminal, the D2D receiving terminal, and the D2D transmitting terminal, and
   the D2D receiving terminal communicates with the D2D transmitting terminal by statically using a resource block equal to the resource block allocated to the cellular terminal per each time period.

4. The system of claim 3, wherein the D2D receiving terminal retries the resource search when a response is not transmitted thereto from the D2D transmitting terminal.

* * * * *